UNITED STATES PATENT OFFICE 2,691,642

STABILIZED POLYVINYLIDENE CHLORIDE COMPOSITIONS CONTAINING FLUORENONE AZINES

Donald Faulkner, Epsom, England, assignor to The Distillers Company Limited, Edinburgh, Scotland, a British company No Drawing. Application April 28, 1952,
Serial No. 284,827

Claims priority, application Great Britain
May 15, 1951

12 Claims. (Cl. 260—45.9)

The present invention is concerned with light stabilisers for compositions containing vinylidene chloride copolymers. The invention provides a composition comprising a vinylidene chloride copolymer and, as light stabiliser, certain fluorenone azines.

Copolymers of vinylidene chloride are capable of being softened under the influence of heat and pressure, and may thus be moulded to form useful articles, whilst some may be extruded and drawn to form useful fibres or filaments. In most cases, such articles or filaments undergo some decomposition when exposed for long periods to the effects of light, especially when such light contains a high proportion of ultraviolet radiation. This decomposition is accompanied by a progressive darkening in colour of the composition, which may change from a practically colourless appearance to dark brown if the action of the radiation is prolonged; this change presents a drawback to the use of articles made from the above polymeric materials.

It is important, therefore, to provide stabilisers which will prevent or minimise the darkening effect observed when vinylidene chloride copolymers are exposed to light. Such stabilisers should preferably be completely compatible with the copolymer when added in the proportion necessary to provide sufficient protection against exposure.

It has now been found that a satisfactory degree of protection against the deleterious action of light may be attained by incorporating in the vinylidene chloride copolymer a fluorenone azine as hereinafter defined, as a stabiliser.

Accordingly, the present invention relates to a composition comprising a vinylidene chloride copolymer, and, as a stabilising agent therefor, a fluorenone azine of the general formula:

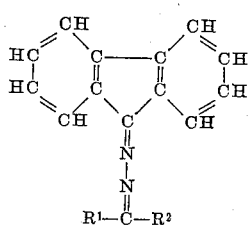

wherein $R^1$ is a hydrocarbon radical which may be substituted or unsubstituted and $R^2$ is hydrogen or a hydrocarbon radical, which may be substituted or unsubstituted, or $R^1$ and $R^2$ together form part of a cyclic radical. In the latter case, the general formula of the stabilising agents employed according to the present invention may be written as follows:

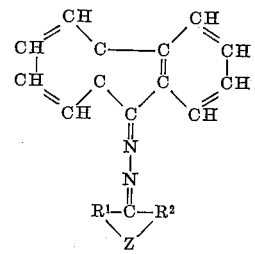

where Z represents the atoms, if necessary, together with $R^1$ and $R^2$ to form a cyclic radical.

Examples of compounds falling within the above general formula which may be mentioned include compounds wherein in the above formula $R^1$ is an alkyl radical such as a methyl, ethyl, propyl, butyl, amyl or hexyl radical or an aryl radical such as a phenyl or naphthyl radical or an aryl radical bearing one or more of the following substituents: a chlorine atom, methyl radical, nitro group and hydroxyl group, and $R^2$ is hydrogen or a methyl radical and compounds wherein $R^1$ and $R^2$, together with the carbon atom to which they are attached, form a cyclic radical. Where $R^2$ is a methyl radical, it is preferred that $R^1$ is an aromatic radical. Specific examples of these compounds include butyral-fluorenone azine ($R^1$=propyl, $R^2$=hydrogen), benzal-fluorenone azine ($R^1$=phenyl, $R^2$=hydrogen), o-chloro-benzal-fluorenone azine ($R^1$=o-chloro-phenyl, $R^2$=hydrogen), salicylal-fluorenone azine ($R^1$=salicyl, $R^2$=hydrogen), 1-naphthal-fluorenone azine ($R^1$=naphthyl, $R^2$=hydrogen), 2-hydroxy-1-naphthal-fluorenone azine ($R^1$=2-hydroxy-naphthyl, $R^2$=hydrogen), alpha-methylbenzal fluorenone azine ($R^1$=phenyl, $R^2$=methyl), cyclohexanone fluorenone azine ($R^1$, $R^2$ and the carbon atom joining them together form a cyclohexylidene radical), fluorenone azine ($R^1$, $R^2$ and the carbon atom joining them together form a fluorenylidene radical).

Fluorenone azine may be prepared directly by reaction between fluorenone and hydrazine in the presence of an acid catalyst. The mixed azines employed according to the invention are conveniently prepared by reaction between the corresponding aldehyde or ketone and fluorenone hydrazone, the latter being prepared by the reaction of fluorenone with hydrazine hydrate. Thus, for example, salicylaldehyde and fluorenone hydrazone react to give salicylal-fluorenone azine, and acetophenone and fluorenone hydrazone react to give alpha-methylbenzal fluorenone azine. Such condensations are preferably carried out in a mutual solvent for the reactants such as ethanol or butanol. The reaction product generally separates from the reaction mixture in crystalline form on cooling, and may, if necessary, be purified by recrystallisation.

The fluorenone azines employed according to the invention are crystalline solids, varying in colour from yellow to dark red. Filaments and films obtained from compositions of vinylidene chloride copolymers containing such azines accordingly range in colour from yellow to deep orange, depending on the particular azine chosen and its concentration. The use of said azines is not therefore recommended where a particularly light-coloured composition is required. For providing adequate stability against the deleterious effects of sunlight or ultra-violet radiation, however, it has been found that the amount of the azine stabiliser which may be used is non-critical, and that the use of amounts of from 0.05-10%, and suitably of 0.05-3% of the weight of the polymer or copolymer, of the azine gives satisfactory results. Some of the azines of the invention give adequate protection against degradation due to exposure to light when used at much lower concentrations than are commonly employed with other types of stabiliser. Thus, to be effective, phenyl salicylate has to be used at a concentration level of the order of 2-5%; in contrast, fluorenone azine has been found to give a high degree of protection even at concentrations ranging from 0.1-0.5% by weight of the vinylidene chloride copolymer.

The fluorenone azines may be mixed with the vinylidene chloride copolymer in any suitable way. Thus, for example, the stabiliser may be dissolved in a volatile organic solvent, such as acetone or benzene, the solution thoroughly mixed with the powdered copolymer in any suitable blending machine, and the solvent removed from the resulting composition by drying. If the vinylidene chloride copolymer is capable of being dissolved in an organic solvent, the stabiliser may be added to the said solution to form a homogeneous mixture, and the stabilised composition recovered by evaporation. Alternatively, a solution of the fluorenone azine in a water-miscible organic solvent, such as ethanol, acetone or dioxan, may be added slowly with stirring to an aqueous dispersion of the finely divided vinylidene chloride copolymer, the resulting uniform polymeric composition separated by filtration or other suitable means, and subsequently dried. According to another alternative, the powdered stabiliser may be mixed with the finely divided copolymer by mechanical means, such as grinding in a ball mill.

The manner in which the stabilisers of this invention are added to the vinylidene chloride copolymer is not critical, and the resulting compositions, however prepared, show considerable stability on exposure to sunlight or light containing a high proportion of ultra-violet radiation. Thus, an untreated film or filament of a vinylidene chloride copolymer may assume a dark brown colour on exposure to sunlight or ultra-violet radiation, whereas a composition containing a comparatively small amount of one of the new stabilisers will resist discolouration for a considerable period when exposed in a similar manner.

The stabilisers may be incorporated in any copolymers of vinylidene chloride, such for example as copolymers of vinylidene chloride with monomers such as vinyl chloride, methyl acrylate, ethyl acrylate, methyl methacrylate, ethyl methacrylate, dimethyl maleate, diethyl maleate, dimethyl fumarate, diethyl fumarate, vinyl acetate, acrylonitrile, and other copolymers which also show evidence of decomposition when exposed to light in the absence of a stabilising agent. The compositions in which the stabilisers are incorporated may also contain, or be compounds with, plasticisers, lubricants, pigments, dyes and the like, used for the purpose of facilitating the processing of the compositions and for providing the required colour in the final article. Other heat- or light-stabilisers used or described in the art may also be present.

The vinylidene chloride copolymer should not contain more than 95% of vinylidene chloride, and suitably should contain from 10%-90% of vinylidene chloride and preferably 70% to 90% of vinylidene chloride.

The following examples illustrate the practice of the invention. The percentages referred to are by weight unless otherwise indicated.

EXAMPLE 1

A copolymer containing about 12% of vinyl chloride units was prepared from a monomer mixture consisting of 85% of vinylidene chloride and 15% of vinyl chloride, and the finely powdered copolymer was treated with 8% of its weight of alpha-alpha'-diphenyldiethyl ether as plasticiser in such a manner as to ensure a uniform composition. Compositions were prepared from the plasticised copolymer and fluorenone azine which is of the formula:

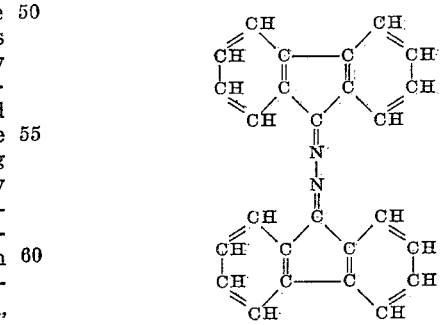

containing 0.05, 0.1, 0.3 and 0.5% by weight of the stabiliser. The first two compositions were prepared by dissolving the stabiliser in acetone, mixing the acetone solution with the copolymer, and evaporating off the acetone. The second two compositions were prepared by grinding together finely powdered fluorenone azine with the powdered plasticised copolymer in a ball mill, this method being chosen on account of the limited solubility of fluorenone azine in acetone and other volatile solvents. The resulting compositions were formed into pellets and extruded from a small ram extruder through an orifice 0.030 inch in diameter, the barrel of the extruder being heated to a temperature of 170–175° C. The filaments so obtained were then drawn by hand so that the diameter was reduced to 0.008 to 0.010 inch. The resulting threads were wound on formers and exposed to light from a carbon arc in a fadeometer. The time required for each sample to show approximately the same degree of degradation, as estimated visually by the depth of brown colour developed, was recorded as giving the relative stabilising effect of each concentration of azine. A blank consisting of fibre obtained similarly from the plasticised copolymer without stabiliser was also included. The results are given in Table I.

Table I

| Percent Fluorenone azine | Time of exposure for standard degradation (hours) |
|---|---|
| 0 | 50 |
| 0.05 | 164 |
| 0.10 | 530 |
| 0.30 | 930 |
| 0.50 | 930 |

EXAMPLE 2

The mixed azines listed in Table II were prepared by condensation of fluorenone hydrazine with the appropriate aldehyde; their melting points, analytical data, and colours are recorded.

Table II

| Flourenone azine | Melting Point, °C. | N content (%) Found | N content (%) Calc. | Colour |
|---|---|---|---|---|
| Butyral | 43–44 | 11.1 | 11.3 | Orange. |
| Salicylal | 132–133 | 9.1 | 9.4 | Yellow. |
| o-Chlorobenzal | 150–151 | 9.0 | 8.8 | Orange red. |
| p-Nitrobenzal | 184–185 | 12.3 | 12.8 | Orange. |
| 1-Naphthal | 139–140 | 8.4 | 8.4 | Do. |
| 2-Hydroxy-1-naphthal | 200–201 | 8.4 | 8.0 | Brick red. |

Benzal fluorenone azine has been described in the literature (J. A. C. S., 1932, p. 3636); it has M. P. 91–92°, and forms orange plates.

Compositions of the plasticised copolymer, as described in Example 1, with 2% of each of the above azines were prepared by mixing samples of the plasticised copolymer with acetone solutions of the required amounts of azine, and evaporating off the acetone. Filaments were prepared from the compositions and exposed in the fadeometer as described in Example 1. The time required for each specimen to reach a standard degree of degradation is given in Table III.

Table III

| Stabilizing agent | Time of exposure for standard degradation (hours) |
|---|---|
| Butyralflourenone azine | 610 |
| Salicylalfluorenone azine | 750 |
| Benzalfluorenone azine | 310 |
| o-Chlorobenzalfluorenone azine | 280 |
| p-Nitrobenzalfluorenone azine | 280 |
| 1-Naphthalfluorenone azine | 280 |
| 2 Hydroxy-1-naphthal-fluorenone azine | 280 |
| Blank | 50 |

EXAMPLE 3

Acetophenone and fluorenone hydrazone were reacted together in butanol solution, and the resulting acetophenone fluorenone azine purified by recrystallisation from light petroleum to give orange plates, M. P. 122–123°; found, N=9.1% (calc., N=9.4%). Acetophenone fluorenone azine is of the formula:

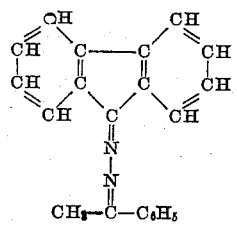

Cyclohexanone and fluorenone hydrazone were reacted together in solution in light petroleum (B. P. 80–100°) giving cyclohexanone fluorenone azine as yellow prisms, M. P. 80–81°; found, N=10.1% (calc., N=10.2%).

Compositions of the plasticised copolymer of vinylidene and vinyl chlorides, as described in Example 1, and 2% of acetophenone fluorenone azine and cyclohexanone fluorenone azine, respectively, were prepared, formed into filaments, and exposed to light from a carbon arc in the fadeometer as described in Examples 1 and 2. The sample containing acetophenone fluorenone azine resisted serious discolouration for 340 hours, and that containing cyclohexanone fluorenone azine for 530 hours, representing an improvement on the performance of a blank containing no stabiliser, which became appreciably discoloured in 50 hours.

EXAMPLE 4

A mixture containing 85 parts by weight of vinylidene chloride, 15 parts by weight of vinyl chloride, 2 parts by part of diethyl maleate, and 7.6 parts by weight of dimethyl phthalate was copolymerised in aqueous dispersion to give a finely divided ternary copolymer uniformly mixed with plasticiser. The yield of the copolymer was 83%, so that the dimethyl phthalate content of the mixture corresponded to 8.9% of the weight of copolymer. Compositions of the plasticised copolymer with different amounts of fluorenone azine were prepared, intimate mixing being obtained by ball-milling. The stabilised compositions were extruded to form filaments and the light stability of the filaments evaluated as described in Example 1. A blank consisting of filament extruded from the plasticised copolymer containing no fluorenone azine was also exposed. The results are given in Table IV.

Table IV

| Percent Fluorenone azine | Time of exposure for standard degradation (hours) |
|---|---|
| 0 | 50. |
| 0.1 | 960. |
| 0.2 | 1,470. |
| 0.3 | over 1,600. |

EXAMPLE 5

A mixture containing 85 parts by weight of vinylidene chloride, 15 parts by weight of vinyl chloride, 2 parts by weight of vinyl acetate, and 7.5 parts by weight of dimethyl phthalate was copolymerised in aqueous dispersion to give a finely divided ternary copolymer uniformly mixed with plasticiser. The yield of copolymer amounted to 80 parts by weight, so that the dimethyl phthalate content of the composition corresponded to 9.4% of the weight of copolymer. The plasticised copolymer was compounded with 0.1% of its weight of fluorenone azine in a ball mill. The stabilised composition was extruded to give a filament, and the light stability of the filament evaluated as described in Example 1. The time required for the filament to undergo a standard degree of degradation was 480 hours, whereas a similar filament containing no fluorenone azine was degraded by 45 hours' exposure.

EXAMPLE 6

The process of Example 2 was repeated using in place of the copolymer employed therein a copolymer prepared from a monomer mixture consisting of 90% of vinylidene chloride and 10% of vinyl chloride, which copolymer was finely powdered and then treated with 8% of its weight of alpha-alpha'-diphenyl-diethyl ether as plasticiser, in such a manner as to ensure a uniform composition. The results obtained were substantially the same as those quoted in Example 2.

The process of the preceding examples may be repeated using in place of the copolymers employed therein other copolymers of vinylidene chloride and vinyl chloride containing at least 10% of vinylidene chloride and preferably at least 70% of vinylidene chloride, or copolymers of vinylidene chloride with other monomers such as methyl acrylate, ethyl acrylate, methyl methacrylate, ethyl methacrylate, dimethyl maleate, dimethyl fumarate, diethyl fumarate, vinyl acetate, acrylonitrile and the like containing at least 10% of vinylidene chloride and preferably at least 70% of vinylidene chloride, the results obtained being essentially like those quoted in the preceding examples.

I claim:

1. A composition of matter comprising a vinylidene chloride copolymer containing not more than 95% of polyvinylidene chloride and as stabilising agent a fluorenone azine of the general formula:

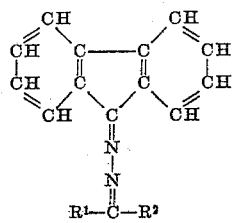

wherein $R^1$ is selected from the group consisting of substituted and unsubstituted hydrocarbon radicals and $R^2$ is selected from the group consisting af hydrogen, substituted and unsubstituted hydrocarbon radicals, and wherein $R^1$ and $R^2$ may be connected together to form the residue of a cyclic hydrocarbon radical.

2. A composition as claimed in claim 1, wherein the fluorenone azine is present in an amount between 0.05% and 10% of the weight of the copolymer.

3. A composition as claimed in claim 1, wherein the copolymer is a copolymer of vinylidene chloride and vinyl chloride.

4. A composition of matter comprising a vinylidene chloride copolymer containing not more than 95% of polyvinylidene chloride and as stabilising agent a fluorenone azine of the general formula:

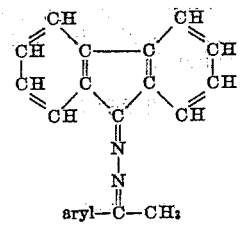

5. A composition of matter comprising a vinylidene chloride copolymer containing not more than 95% of polyvinylidene chloride and as stabilising agent a fluorenone azine of the general formula:

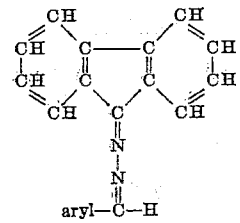

6. A composition of matter comprising a vinylidene chloride copolymer containing not more than 95% of polyvinylidene chloride and as stabilising agent a fluorenone azine of the general formula:

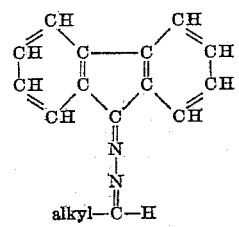

7. A composition of matter comprising a vinylidene chloride copolymer containing not more than 95% of polyvinylidene chloride and as stabilising agent a fluorenone azine of the general formula:

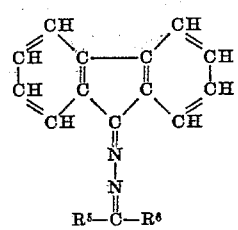

wherein $R^5$ and $R^6$ together form the residue of a cyclic hydrocarbon radical.

8. A composition of matter comprising a vinylidene chloride copolymer containing not more than 95% of polyvinylidene chloride and as stabilising agent fluorenone azine.

9. A composition of matter comprising a vinylidene chloride copolymer containing not more than 95% of polyvinylidene chloride and as stabilising agent butyral-fluorenone azine.

10. A composition of matter comprising a vinylidene chloride copolymer containing not more than 95% of polyvinylidene chloride and as stabilising agent salicylal-fluorenone azine.

11. A composition of matter comprising a vinylidene chloride copolymer containing not more than 95% of polyvinylidene chloride and as stabilising agent acetophenone fluorenone azine.

12. A composition of matter comprising a vinylidene chloride copolymer containing not more than 95% of polyvinylidene chloride and as stabilising agent cyclohexanone fluorenone azine.

No references cited.